(12) United States Patent
Sakita et al.

(10) Patent No.: US 11,742,703 B2
(45) Date of Patent: Aug. 29, 2023

(54) FOREIGN SUBSTANCE DETECTION DEVICE, WIRELESS POWER TRANSMISSION DEVICE, AND WIRELESS POWER TRANSMISSION SYSTEM

(71) Applicant: TDK CORPORATION, Tokyo (JP)

(72) Inventors: Kouichi Sakita, Tokyo (JP); Masayuki Yamashima, Tokyo (JP); Ryo Shiozaki, Tokyo (JP); Kazuki Yoneda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/550,605

(22) Filed: Dec. 14, 2021

(65) Prior Publication Data

US 2022/0200357 A1 Jun. 23, 2022

(30) Foreign Application Priority Data

Dec. 18, 2020 (JP) .................................. 2020-210119

(51) Int. Cl.
*H02J 50/60* (2016.01)
*H02J 7/00* (2006.01)
(Continued)

(52) U.S. Cl.
CPC ............ *H02J 50/60* (2016.02); *G06T 7/0002* (2013.01); *H02J 7/0042* (2013.01); *H02J 7/0047* (2013.01);
(Continued)

(58) Field of Classification Search
CPC ........ H02J 50/60; H02J 7/0042; H02J 7/0047; H02J 50/10; H02J 50/12; G06T 7/0002; G06T 2207/30168; G06T 2207/10016; G06T 2207/20224; G06T 2207/30164; G06T 7/0008; G06T 7/001; H04N 5/247;
(Continued)

(56) References Cited

U.S. PATENT DOCUMENTS

2013/0241476 A1* 9/2013 Okada .................. B60L 53/126
320/108
2018/0166929 A1* 6/2018 Sawai ....................... G01V 3/10
(Continued)

FOREIGN PATENT DOCUMENTS

JP 2017-135838 A 8/2017

*Primary Examiner* — Lincoln D Donovan
*Assistant Examiner* — Alex W Lam
(74) *Attorney, Agent, or Firm* — Oliff PLC

(57) ABSTRACT

A foreign substance detection device for limiting deterioration in accuracy of foreign substance detection even if a foreign substance detection region changes. The device includes an imaging device configured to keep a region for detecting a foreign substance in an imaging range of the imaging device and a determination unit configured to determine a presence or absence of the foreign substance on the basis of a result of comparing a captured image captured by the imaging device with a reference image free of the foreign substance in the imaging range. The determination unit determines that the captured image is free of a foreign substance on the basis of the result of comparing and a prescribed first condition is satisfied, the unit executes an update process of replacing the reference image with the captured image for which the unit determines freedom of a foreign substance as an updated reference image.

29 Claims, 7 Drawing Sheets

(51) Int. Cl.
*H02J 50/10* (2016.01)
*G06T 7/00* (2017.01)
*H04N 23/90* (2023.01)
*H04N 17/00* (2006.01)

(52) U.S. Cl.
CPC ............ *H02J 50/10* (2016.02); *H04N 23/90* (2023.01); *G06T 2207/30168* (2013.01); *H04N 17/002* (2013.01)

(58) Field of Classification Search
CPC .... H04N 17/002; H04N 5/2171; Y02T 10/70; Y02T 10/7072; Y02T 90/14; B60L 53/124
See application file for complete search history.

(56) References Cited

U.S. PATENT DOCUMENTS

| | | | |
|---|---|---|---|
| 2018/0266968 A1* | 9/2018 | Hirai | ........................ G06T 7/001 |
| 2019/0014240 A1* | 1/2019 | Lee | ........................... H04N 7/18 |
| 2021/0257863 A1* | 8/2021 | Sato | ........................ H02J 50/12 |

* cited by examiner

411

412

413

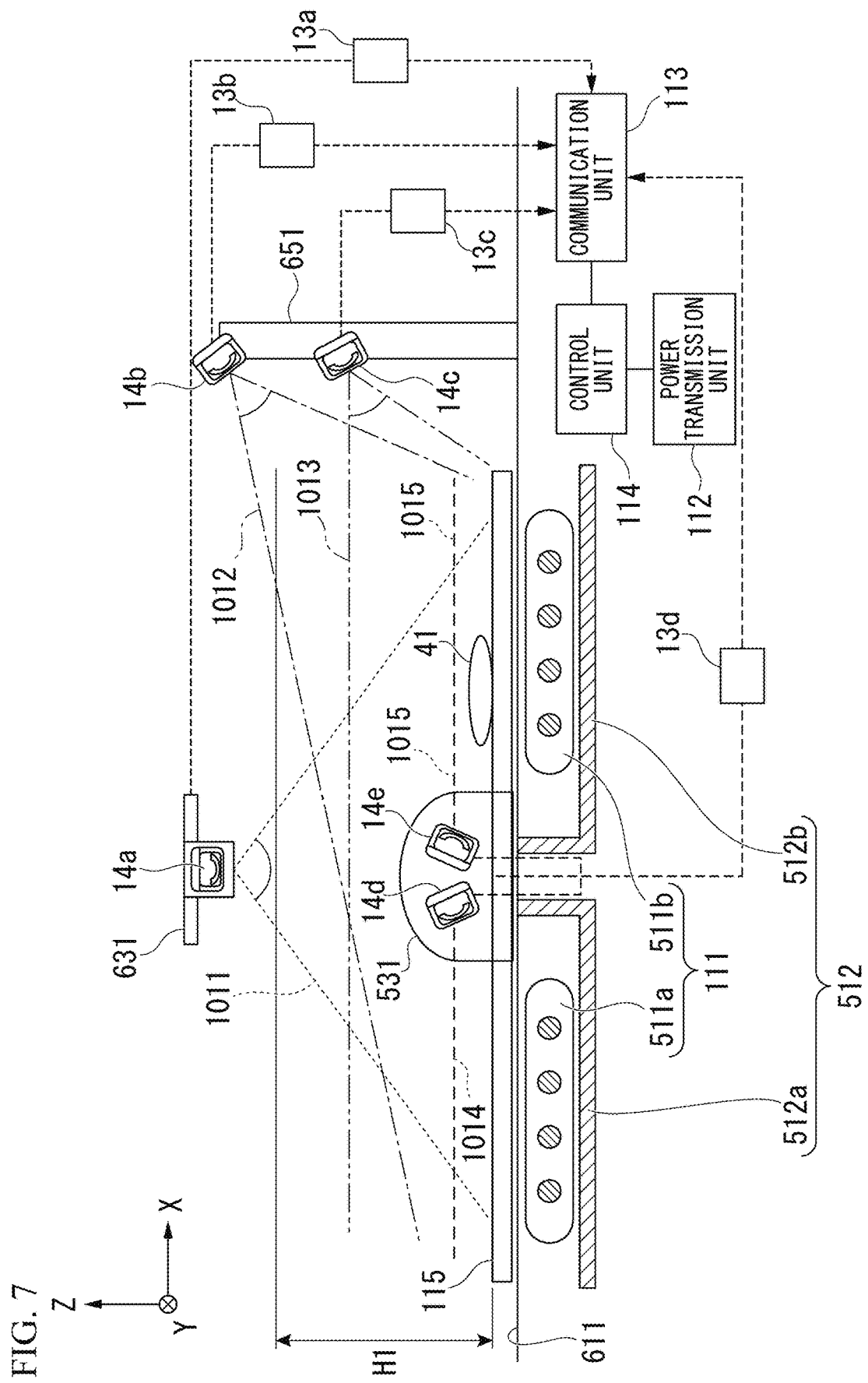

FOREIGN SUBSTANCE DETECTION DEVICE, WIRELESS POWER TRANSMISSION DEVICE, AND WIRELESS POWER TRANSMISSION SYSTEM

CROSS-REFERENCE TO RELATED APPLICATION

Priority is claimed on Japanese Patent Application No. 2020-210119, filed Dec. 18, 2020, the content of which is incorporated herein by reference.

BACKGROUND OF THE INVENTION

Field of the Invention

The present disclosure relates to a foreign substance detection device, a wireless power transmission device, and a wireless power transmission system.

Description of Related Art

In the related art a wireless power transmission system, which transmits electric power wirelessly, is known.

In the wireless power transmission system, if there is a foreign substance on a surface of a power transmission coil, a reception level of electric power transmitted from the power transmission coil is likely to decrease. Thus, a foreign substance detection, device for detecting the presence or absence of such a foreign substance is used.

In a wireless power transmission system described in Patent Document 1, a first determination process of determining the presence or absence of a foreign substance on the basis of an image captured by an imaging device that images a detection region (a foreign substance detection region) including at least a part of a coil unit is performed. In this case, in the wireless power transmission system, the presence or absence of a foreign substance is determined by detecting a pixel difference between data of an image (a background image) captured in advance in a state in which there is no foreign substance in the detection region and data of an image captured in the first determination process (see Patent Document 1).

PATENT DOCUMENTS

[Patent Document 1] Japanese Unexamined Patent Application, First Publication No. 2017-135838

SUMMARY OF THE INVENTION

However, in the wireless power transmission system described in Patent Document 1, as compared with when a background image is captured, the accuracy of detection of the presence or absence of a foreign substance may deteriorate when a state of the foreign substance detection region has changed. Here, the change in the state of the foreign substance detection region may occur due to, for example, dirt on a power transmission coil cover due to aged deterioration, deterioration in the coating, or the like.

The present disclosure has been made in consideration of such circumstances, and an objective of the present, disclosure is to provide a foreign substance detection device, a wireless power transmission device, and a wireless power transmission system capable of limiting deterioration in the accuracy of foreign substance detection even if a state of a foreign substance detection region can change.

According to an aspect of the present disclosure, there is provided a foreign substance detection device including: an imaging device configured to keep a region for detecting a foreign substance in an imaging range of the imaging device; and a determination unit configured to determine a presence or absence of the foreign substance on the basis of a result of comparing a captured image captured by the imaging device with a reference image free of the foreign substance in the imaging range, wherein, when the determination unit determines that the captured, image is free of a foreign substance on the basis of the result of comparing and a prescribed first condition is satisfied, the determination unit executes an update process of replacing the reference image with the captured image for which the determination unit determines to be free of a foreign substance as an updated reference image, According to an aspect of the present disclosure, there is provided a wireless power transmission device including: a power transmission coil; a power transmission unit configured to supply alternating current (AC) power to the power transmission coil; and the foreign substance detection device.

According to an aspect of the present disclosure, there is provided a wireless power transmission system including: the wireless power transmission device; and a wireless power reception device having a power reception coil to which the wireless power transmission device transmits electric power.

The foreign substance detection device, the wireless power transmission device, and the wireless power transmission system according to the present disclosure can limit deterioration in the accuracy of, foreign substance detection even if a state of a foreign substance detection region can change.

BRIEF DESCRIPTION OF THE DRAWINGS

FIG. 7 is a diagram showing an example of an arrangement of an imaging device according to the embodiment.

DETAILED DESCRIPTION OF THE INVENTION

Hereinafter, embodiments of the present disclosure will be described with reference to the drawings.

<Wireless Power Transmission System>

Figure 1:
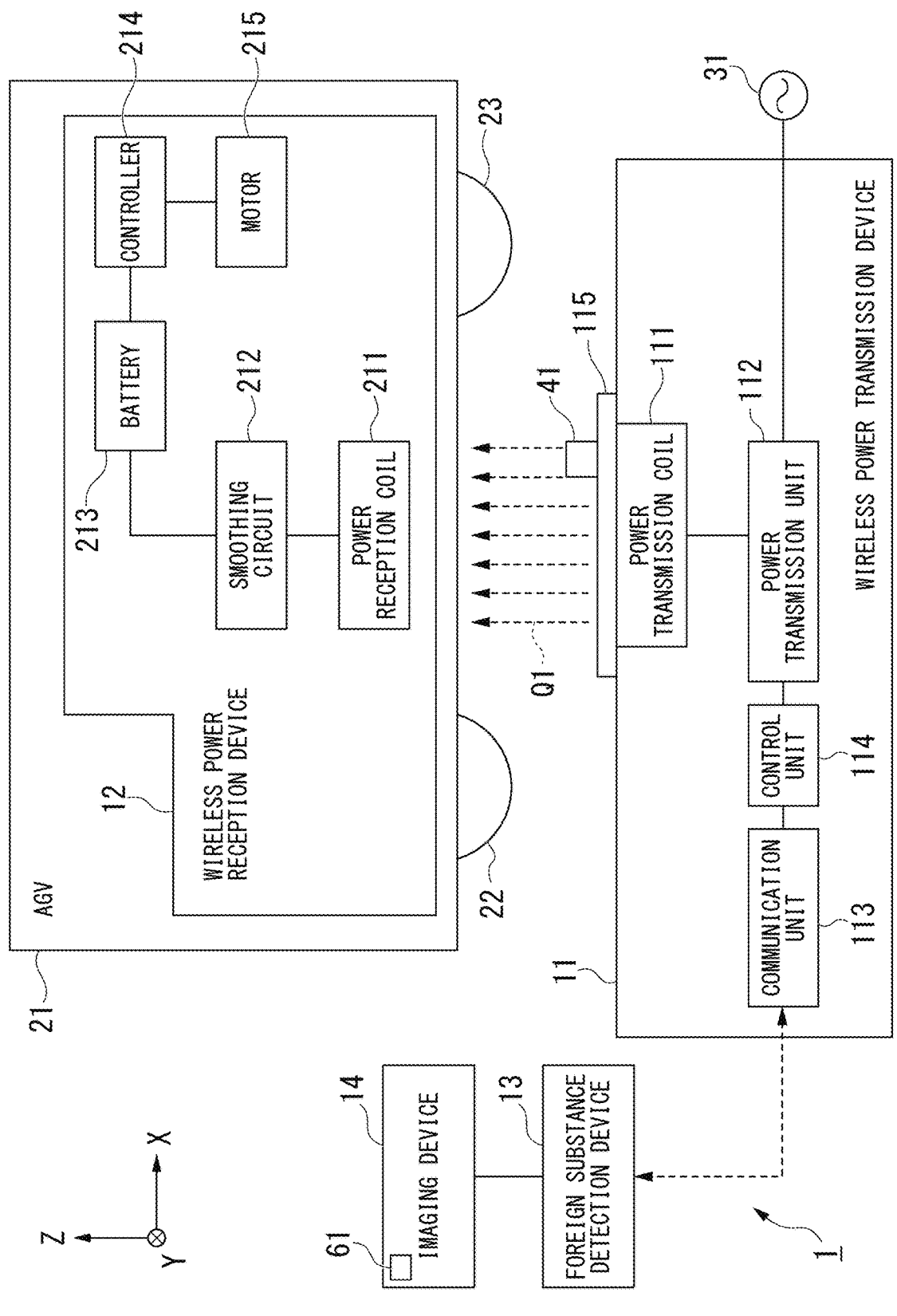
FIG. 1 is a diagram showing an example of a configuration of a wireless power transmission system according to an embodiment.

FIG. 1 is a diagram showing an example of a configuration of a wireless power transmission system 1 according to an embodiment.

In FIG. 1, XYZ coordinate axes, which are three-dimensional orthogonal coordinate axes, are shown for convenience of description.

In the present embodiment, a direction of a Z-axis is a height direction, a direction from a negative coordinate to a positive coordinate of the Z-axis corresponds to an upward direction, and a direction from a positive coordinate to a negative coordinate of the Z-axis corresponds to a downward direction (a direction of gravity).

Also, in the present embodiment, the ground surface is a plane parallel to an XY plane. In the present embodiment, in order to simplify the description, the ground surface is assumed to be a flat surface.

The wireless power transmission system 1 includes a wireless power transmission device 11, an automatic guided vehicle (AGV) 21 which is a moving object equipped with a wireless power reception device 12, and an AC power source 31.

The wireless power transmission device 11 includes a separate foreign substance detection device 13.

The foreign substance detection device 13 includes a separate imaging device 14.

The AGV 21 includes wheels 22 and 23 (and two wheels that cannot be seen from the viewpoint of FIG. 1) and can be moved by rotating the wheels 22 and 23.

The AGV 21 is wirelessly controlled by, for example, a host system (not shown) to perform an operation such as a movement.

Also, as the moving object, a moving object other than an AGV may be used.

The wireless power transmission device 11 includes a power transmission coil 111, a power transmission unit 112, a communication unit 113, a control unit 114, and a power transmission coil cover 115, in addition to the separate foreign substance detection device 13.

The wireless power reception device 12 includes a power reception coil 211, a smoothing circuit 212, a battery 213, a controller 214, and a motor 215.

In the present embodiment, the imaging device 14 is configured separately from the foreign substance detection device 13. As another configuration example, the imaging device 14 may be configured to be integrated with the foreign substance detection device 13.

Also, in the present embodiment, the foreign substance detection device 13 and the imaging device 14 are configured separately from the wireless power transmission device 11. As another configuration example, one or both of the foreign substance detection device 13 and the imaging device 14 may be configured to be integrated with the wireless power transmission device 11.

Also, although an example of a configuration in which the foreign substance detection device 13 includes the imaging device 14 is shown in the present embodiment, the foreign substance detection device 13 does not include the imaging device 14 and the imaging device 14 may be configured independently of the foreign substance detection device 13 as another configuration example.

Also, although an example of a configuration in which the wireless power transmission device 11 includes the foreign substance detection device 13 and the imaging device 14 is shown in the present embodiment, the wireless power transmission device 11 does not include the foreign substance detection device 13 and the imaging device 14 and the foreign substance detection device 13 and the imaging device 14 may be configured independently of the wireless power transmission device 11 as another configuration example.

The AC power source 31 may be any AC power source, and is, for example, a commercial AC power source.

Although an example of a configuration in which the wireless power transmission system 1 includes the AC power source 31 is shown in the present embodiment, the wireless power transmission system 1 may be configured without including the AC power source 31 as another configuration example.

In FIG. 1, transmission power Q1, which is electric power transmitted from the power transmission coil 111 of the wireless power transmission device 11, is schematically shown.

Also, in FIG. 1, a foreign substance 41 present above the surface of the power transmission coil 111 of the wireless power transmission device 11 is shown schematically. The foreign substance 41 is an example and the number of foreign substances, a size of a foreign substance, a location where a foreign substance is present, or the like may be arbitrary. The foreign substance 41 may be, for example, one or more of a metal, a combustible material, a living body, and the like.

In the present embodiment, the wireless power transmission device 11 is installed at a prescribed place in a factory or the like. The AGV 21 equipped with the wireless power reception device 12 moves to perform various types of operations and moves to a place where the wireless power transmission device 11 is installed when charging is required, so that the AGV 21 is charged with electric power transmitted from the wireless power transmission device 11 to the wireless power reception device 12.

In FIG. 1, a case where the power reception coil 211 of the wireless power reception device 12 is located above the power transmission coil 111 of the wireless power transmission device 11 is shown.

<Wireless Power Transmission Device>

The wireless power transmission device 11 will be described.

The power transmission coil 111 is, for example, a wireless power transmission coil in which a conductor wire has been wound. The power transmission coil 111 of the present embodiment is installed on a floor (for example, the ground) or embedded in the floor so that the power transmission coil 111 faces a lower surface of a housing of the AGV 21 when the AGV 21 is located above the power transmission coil 111.

The power transmission unit 112 supplies AC power to the power transmission coil 111 using the AC power supplied from the AC power source 31. Thereby, electric power is transmitted from the power transmission coil 111.

Here, the power transmission unit 112 may convert the AC power supplied from the AC power source 31 into a direct current (DC) voltage using an AC/DC converter, convert the DC voltage into an AC voltage, and supply the AC voltage to the power transmission coil 111. In this case, instead of the AC/DC converter, a conversion circuit in which a rectifying/smoothing circuit, which rectifies the AC voltage and converts the rectified AC voltage into a DC voltage, is combined with a power factor correction (PFC) circuit, which improves the power factor, and the like may be used.

The communication unit 113 communicates with the foreign substance detection device 13.

By controlling the power transmission unit 112, the control unit 114 performs control for switching on/off of power transmission, control for switching a power transmission level, control for, switching a power transmission frequency, and the like.

For example, the control unit 114 may control the power transmission unit 112 on the basis of a signal received from the foreign substance detection device 13 through, the communication unit 113.

<Wireless Power Reception Device>

The wireless power reception device 12 will be described.

The power reception coil 211 becomes a target to which the wireless power transmission device 11 transmits electric power.

The power reception coil 211 is, for example, a wireless power transmission coil in which a conductor wire has been wound. In the present embodiment, the power reception coil 211 is installed near the lower surface of the housing of the AGV 21.

The power reception coil 211 supplies, an AC voltage to the smoothing circuit 212 when the electric power has been received.

In the present embodiment, when the power reception coil 21 is located above the power transmission coil 111, the surface of the power transmission coil 111 and the surface of the power reception coil 211 are, arranged to be parallel (or substantially parallel) to each other and the electric power transmitted from the power transmission coil 111 is received by the power reception coil 211.

Also, any configuration may be used as a configuration in which the electric power is transmitted from the power transmission coil 111 to the power reception coil 211.

The smoothing circuit 212 rectifies the AC voltage supplied from the power reception coil 211, converts the rectified AC voltage into a DC voltage, and supplies the DC voltage to the battery (secondary battery) 213. Thereby, the battery 213 is charged.

The controller 214 drives the motor 215 using the electric power with which the battery 213 has been charged.

The motor 215 causes the AGV 21 to travel using the electric power supplied from the battery 213 (the electric power supplied via the controller 214 in the example of FIG. 1). The motor 215 is, for example, a motor that rotates the wheels 22 to 23.

Thereby, for example, the AGV 21 can move using the electric power supplied wirelessly without connecting to a charging cable.

<Foreign Substance Detection Device Including Imaging Device>

The foreign substance detection device 13 including the imaging device 14 will be described.

The imaging device 14 is configured using, for example, a camera.

The imaging device 14 keeps a prescribed region in the imaging range of the imaging device 14. The imaging device 14 captures an image in an imaging range.

Here, the prescribed region is a foreign substance detection region and is a target region for determining the presence or absence of a foreign substance. For example, the detection region is set in advance.

In the present embodiment, the detection region includes a region on the surface side of the power transmission coil 111 of the wireless power transmission device 11. In the present embodiment, the power transmission coil cover 115 is present in a region on the surface side of the power transmission coil 111. Thus, in the present embodiment, the image captured by the imaging device 14 includes an image of a part or all of an upper surface of the power transmission coil cover 115.

Also, in the present embodiment, the imaging device 14 captures a still image.

As another example, the imaging device 14 may capture a moving image, and in this case, the imaging device 14 may transmit a still image constituting the moving image to the foreign substance detection device 13. The moving image may be transmitted from the imaging device 14 to the foreign substance detection device 13 and the foreign substance detection device 13 may extract the still image constituting the moving image received from the imaging device 14.

The imaging device 14 includes a light-emitting unit 61 that emits light.

The imaging device 14 can emit light to a foreign substance detection region or the like using the light-emitting unit 61 at the time of imaging.

Here, the light-emitting unit 61 may be integrated with the imaging device 14 or may be separated from the imaging device 14, and, in this case, the light-emitting, unit 61 may be arranged at a position separated from that of the imaging device 14.

Also, a configuration in which the imaging device 14 does not include the light-emitting unit 61 may be used.

Figure 2:
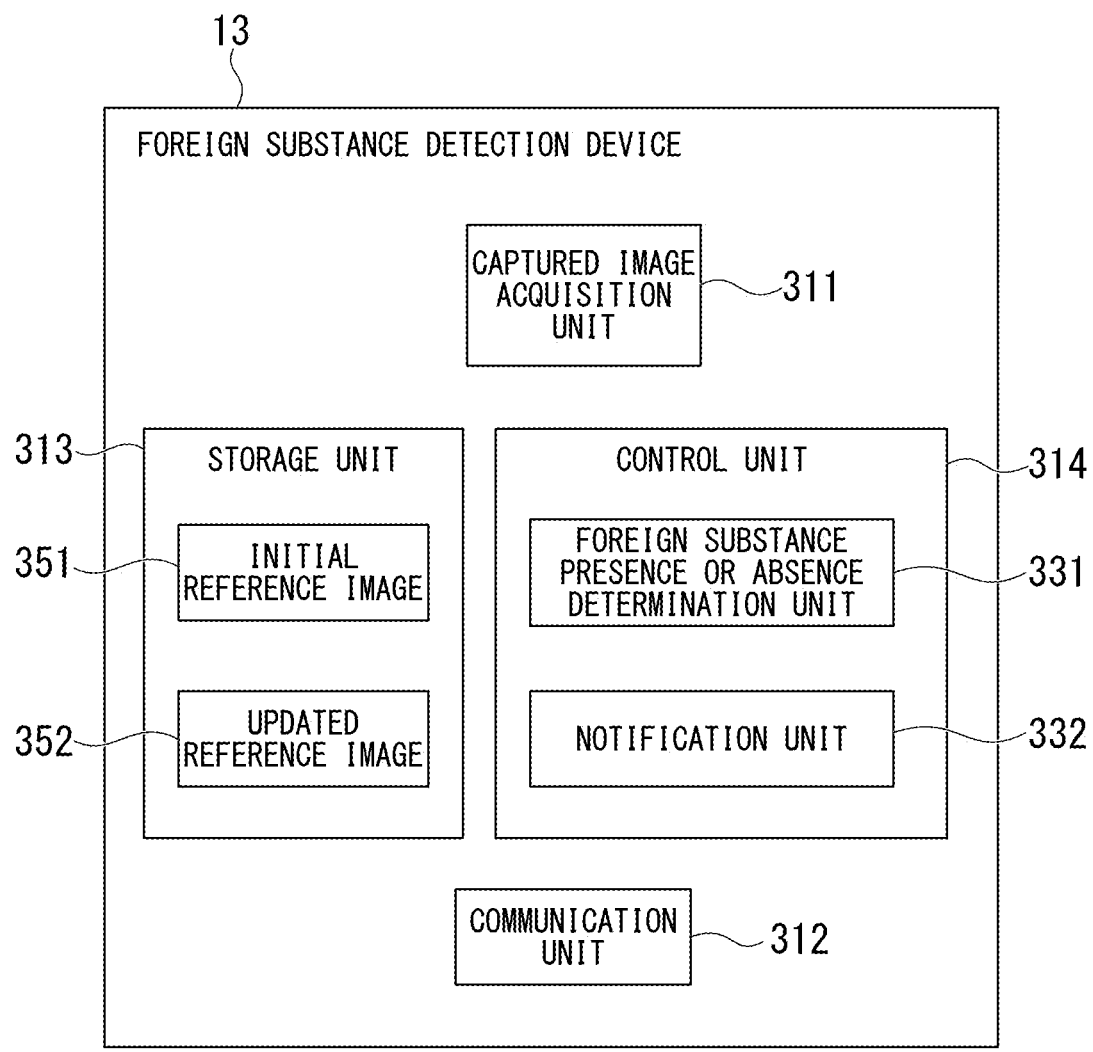
FIG. 2 is a diagram showing an example of a configuration of a foreign substance detection device according to the embodiment.

FIG. 2 is a diagram showing an example of a configuration of the foreign substance detection device 13 according to the embodiment. In FIG. 2, the illustration of the imaging device 14 is omitted.

The foreign substance detection device 13 includes a captured image acquisition unit 311, a communication unit 312, a storage unit 313, and a control unit 314.

The control unit 314 includes a foreign substance presence or absence determination unit (referred to as a determination unit) 331 and a notification unit 332.

In FIG. 2, an initial reference image 351 and an updated reference image 352 are shown as images stored in the storage unit 313. In the present embodiment, these may be referred to as reference images.

The communication unit 312 communicates with an external device. In the present embodiment, the communication unit 312 can communicate with the imaging device 14 and can also communicate with the communication unit 113 of the wireless power transmission device 11.

The above-described communication may be, for example, wired communications or wireless communications.

The captured image acquisition unit 311 acquires an image (a captured image) captured by the imaging device 14. In the present embodiment, the captured image acquisition unit 311 acquires the captured image by communicating with the imaging device 14 through the communication unit 312 and receiving the captured image.

The storage unit 313 is configured using a storage device and stores various types of information.

In the present embodiment, the storage unit 313 stores the initial reference image 351 and the updated reference image 352.

Here, the initial reference image 351 is an initial reference image and the updated reference image 352 is a reference image that has been updated one or more times with respect to the initial reference image 351.

In the present embodiment, the reference image is an image used as a reference for determining whether or not the foreign substance 41 is shown in the image captured by the imaging device 14.

The initial reference image 351 may be, for example, an image captured by the imaging device 14 before the presence or absence of the foreign substance 41 is determined, or may be an image generated in image processing.

As the updated reference image 352, an image captured by the imaging device 14 is used when a prescribed condition is satisfied after the initial reference image 351 is set.

In the present embodiment, the foreign substance detection device 13 acquires an image captured by the imaging device 14 as a reference image at the time of installation of the wireless power transmission device 11 and stores (saves) the reference image as the initial reference image 351 in the storage unit 313. In the present embodiment, the initial reference image 351 corresponds to the reference image (an installation-related initial reference image) at the time of installation of the wireless power transmission device 11. Also, in the present embodiment, the reference image (the installation-related initial reference image) is reset in the case where maintenance on the power transmission coil cover 115 has been performed or the like.

Here, in the present embodiment, only the initial reference image 351 is initially stored in the storage unit 313 and both the initial reference image 351 and the updated reference image 352 are stored when the reference image is updated once or more from the initial reference image 351. Also, if a configuration in which the initial reference image 351 is not used (a configuration different from that of the present embodiment) is adopted after the reference image is updated once or more from the initial reference image 351, the initial reference image 351 may be deleted.

Also, although only the latest updated reference image 352 is overwritten and stored in the storage unit 313 when the reference image is updated twice or more from the initial reference image 351 in the present embodiment, for example, a previously updated reference image 352 that is not the latest, may be stored in a history.

The control unit 314 performs various types of processes and control.

The control unit 314 includes, for example, a processor such as a central processing unit (CPU) and the processor executes a program (a control program) stored in the storage unit 313 to perform various types of processes and control.

The determination unit 331 determines the presence or absence of a foreign substance on the basis of a result of comparing the captured image captured by the imaging device 14 with the reference image in which there is no foreign substance (the reference image free of the foreign substance) in the imaging range.

In the present embodiment, the determination unit 331 compares the captured image acquired by the captured image acquisition unit 311 with the reference image and determines the presence or absence of the foreign substance 41 on the basis of a difference between these images. For example, the determination unit 331 determines that there is a foreign substance 41 when it is determined that a value representing the difference is greater than or equal to a prescribed threshold value (referred to as a first threshold value in the present embodiment), and determines that there is no foreign substance 41 when it is determined that the value representing the difference is less than the first threshold value. In this case, assuming that the background image for the captured image is the reference image, a portion where the captured image has changed from the background image (the reference image) is detected as a difference.

Here, the determination unit 331 initially uses the initial reference image 351 as a reference image for determining the presence or absence of a foreign substance and uses the updated reference image 352 as the reference image for determining the presence or absence of a foreign substance when the initial reference image 351 has been updated once or more.

Also, instead of the determination of whether the value is greater than or equal to the first threshold value or less than the first threshold value, the determination of whether the value exceeds the first threshold value or is less than or equal to the first, threshold value may be used.

The foreign substance detection device 13 detects the foreign substance 41 by determining that the foreign substance 41 is present in the determination unit 331.

The determination unit 331 determines that there is no, foreign substance on the basis of the result of comparing the captured image with the reference image and executes an update process of updating the reference image to a captured image (a captured image serving as the updated reference image 352) for which the determination unit 331 determines that there is no foreign substance in accordance with a prescribed condition (a prescribed first condition in the present embodiment) that, is satisfied. The update process is a process of replacing the reference image with the captured image for which the determination unit determines to be free of a foreign substance as an updated reference image.

In the present embodiment, the initial reference image 351 is initially used as the reference image and the determination unit 331 generates the updated reference image 352 by updating the initial reference image 351 and stores the updated reference image 352 in the storage unit 313. Subsequently, the latest updated reference image 352 is used as the reference image, and the determination unit 331 updates the latest updated reference image 352 to generate the updated reference image 352 after the update process and stores the updated reference image 352 as the latest reference image in the storage unit 313.

Here, various conditions may be used as the first condition.

As an example, the first condition is that the foreign substance detection device 13 is activated. When this first condition is used, the first condition is always satisfied when the foreign substance detection device 13 is activated (for example, when the foreign substance detection device 13 is in operation).

As another example, the first condition is that the number of consecutive times it is determined that there is no foreign substance on the basis of the result of comparing the captured image with the reference image exceeds the prescribed number of times. Any number of times may be used as the prescribed number of times.

As, another example, the first condition is that it is determined that there is no foreign substance continuously for a prescribed period on the basis of the result of comparing the captured image with the reference image. Any period may be used as the prescribed period.

As another example, the first, condition is that a consecutive operation time period has elapsed for a prescribed time period. The prescribed time period may be any time period and, for example, may be longer than a time period of one power transmission cycle in which power transmission using the power transmission coil 111 starts and ends.

Here, one power transmission cycle has a time period from the start to the end of one process of power transmission to one AGV 21 and, when there is a change in the time period a setting process according to, for example, the longest time period, is performed.

Also, when a plurality of types of AGVs 21 are used, a setting process according to the longest time period within the plurality of types of AGVs 21 as one transmission cycle is performed.

As another example, the first condition is that a prescribed time period (for example, a time period from the current date and time to the next date and time) corresponding to a determined date and time has elapsed. As the date and time, any date and time may be used. The date and time may be, for example, a time determined every morning, a time determined every evening, a time determined on the same day of the week, or the like. The prescribed time period is, for example, longer than a time period of one power transmission cycle in which power transmission using the power transmission coil 111 starts and ends.

The notification unit 332 provides various types of notifications.

The mode of the notification may be any mode and may be, for example, a mode in which a prescribed signal is transmitted externally, or a mode such as image display or sound output.

The determination unit 331 determines the necessity of maintenance.

The notification unit 332 can externally transmit a maintenance request signal for requesting maintenance.

In the present embodiment, the determination unit 331 compares an installation-related initial reference image (the initial reference image 351 in the present embodiment) among reference images with the updated reference image 352 in accordance with a prescribed condition (referred to as a second condition in the present embodiment) that is satisfied. The notification unit 332 externally transmits the maintenance, request signal when a result of comparing the initial reference image 351 with the updated reference image 352 indicates that a prescribed condition (referred to as a third condition in the present embodiment) is satisfied.

Also, various conditions may be used as the second condition.

For example, as the second condition, a condition that a prescribed period has elapsed or a condition that it is determined that there is no foreign substance, continuously for the prescribed period on the basis of the result of comparing the captured image with the reference image may be used.

As the second condition, a condition that is the same as the first condition may be used.

Also, various conditions may be used as the third condition.

For example, as the third condition, a condition in which a determination similar to the determination of the presence or absence of a foreign substance is performed by comparing the initial reference image 351 with the updated reference image 352 may be used. In this case, a value different from the first, threshold value for determining the presence or absence of a foreign substance may be used as a threshold value (referred to as a second threshold value in the present embodiment) for determining the necessity of maintenance.

Here, an external destination to which the maintenance request signal is transmitted may be arbitrary. For example, the external destination may be the wireless power transmission device 11 which is separate from the foreign substance detection device 13, the wireless power reception device 12, any output device having a function of outputting information of the maintenance request, a robot that automatically executes maintenance in accordance with the reception of the maintenance request signal, or a system of a prescribed user (for example, a person related to maintenance), or the like.

The above-described output device may be, for example, one or more of a display device that displays and outputs maintenance request information, a sound output device that, outputs maintenance request information by sound, a light-emitting device that turns on or off or blinks a lamp indicating a maintenance request, and the like.

Also, for example, the maintenance may be performed manually or may be performed automatically by a robot.

In the present embodiment, the maintenance is, for example, maintenance on the power transmission coil cover 115. When it is determined that maintenance is necessary, this indicates a case where it is diagnosed that the power transmission coil cover 115 has deteriorated.

In this case, a person or a robot that performs maintenance performs the removal of the foreign substance 41 and the like by, for example, cleaning the power transmission coil cover 115 for which maintenance is necessary.

The determination unit 331 has a function of determining the presence or absence of an abnormality in the captured image. When the determination unit 331 determines that the captured image is abnormal, a signal of the occurrence of an abnormality in the imaging device 14 is externally transmitted.

Here, various methods may be used as a method of determining the presence or absence of an abnormality in the captured image.

Also, an external destination to which the signal of the occurrence of an abnormality in the imaging device 14 is transmitted may be arbitrary or may be, for example, the same as or different from the external destination to which the maintenance request signal is transmitted.

<Example of Timing of Determination of Presence or Absence of Foreign Substance>

The foreign substance detection device 13 executes an operation of determining the presence or absence of a foreign substance before the start of power transmission of the wireless power transmission device 11.

Here, the foreign substance detection device 13 determines a power transmission state (a power transmission drive state) of the wireless power transmission device 11 by communicating with the wireless power transmission device 11. The wireless power transmission device 11 outputs information indicating the power transmission state to the foreign substance detection device 13. The power transmission state may be, for example, one or more of a state in which electric power is being transmitted, a state in which no electric power is being transmitted, and a state in which electric power is scheduled to be transmitted but is not currently being transmitted.

The time before the start of power transmission may be, for example, when no electric power is being transmitted or when no electric power is being transmitted before the scheduled power transmission. The time before the scheduled power transmission may be, for example, a prescribed time period (for example, one minute or the like) earlier than, the scheduled power transmission time.

For example, the foreign substance detection device 13 acquires a captured image (a captured image for determining the presence or absence of a foreign substance) captured by the imaging device 14 before a device (the AGV 21 in the present embodiment) equipped with the wireless power reception device 12 is arranged above the power transmission coil 111.

Here, the foreign substance detection device 13 may determine whether or not the AGV 21 has been arranged above the power transmission coil 111, for example, on the basis of information of the captured image captured by the imaging device 14.

Also, the foreign substance detection device 13 may acquire information about a current position or a future position (a scheduled position) of the AGV 21 from, for example, the host system of the AGV 21. In this case, the host system manages the position of the AGV 21 and the like and notifies the foreign substance detection device 13 of the information about the position of the AGV 21.

<Specific Example of Determination of Presence or Absence of Foreign Substance>

An example of the determination of the presence or absence of a foreign substance will be described with reference to FIGS. 3A, 3B, and 3C.

Figure 3A:
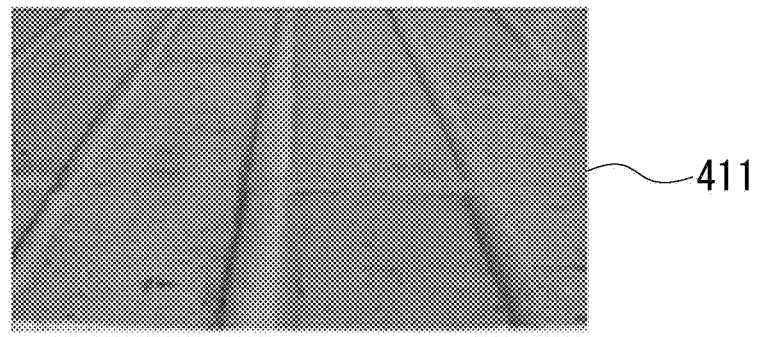
FIG. 3A is a diagram showing an example of a captured image according to the embodiment.

FIG. 3A is a diagram showing an example of a captured image 411 according to the embodiment.

Figure 3B:
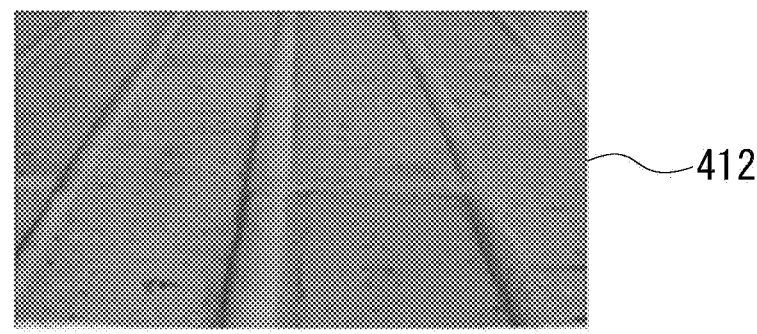
FIG. 3B is a diagram showing an example of a reference image according to the embodiment.

FIG. 3B is a diagram showing an example of a reference image 412 according to the embodiment.

Figure 3C:
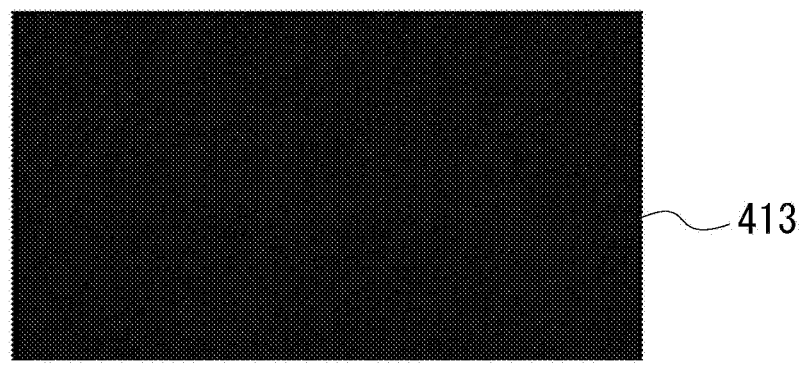
FIG. 3C is a diagram showing an example of a difference image according to the embodiment.

FIG. 3C is a diagram showing an example of a difference image 413 according to the embodiment.

Here, the reference image 412 is the initial reference image 351 at the initial stage and is the updated reference image 352 after the reference image is updated one or more times.

The present example is an example when there is no foreign substance 41.

In the foreign substance detection device 13, the determination unit 331 compares the captured image 411 serving as a determination target with the reference image 412 stored in the storage unit 313 and calculates the difference image 413 representing a difference between these two images.

In the present embodiment, the determination unit 331 calculates the difference image 413 representing a difference between pixel values of these two images.

The difference image 413 shown in FIG. 3C is represented by binary values (for example, value 0 and value 1). One pixel value (for example, value 0=white) represents a pixel having a difference. The other pixel value (for example, value 1=black) represents a pixel that has no difference.

The determination unit 331 calculates the number (total number) of pixels having a difference in the difference image 413, determines that there is a foreign substance 41 when the number is greater than or equal to a prescribed first, threshold value, and determines that there is no foreign substance 41 when the number is less than the first threshold value.

In the example of FIG. 3C, the number of pixels having a difference is 0 (an ideal example) and the determination unit 331 determines that there is no foreign substance 41.

An example of the determination of the presence or absence of a foreign substance will be described with reference to FIGS. 4A, 4B, and 4C.

Figure 4A:
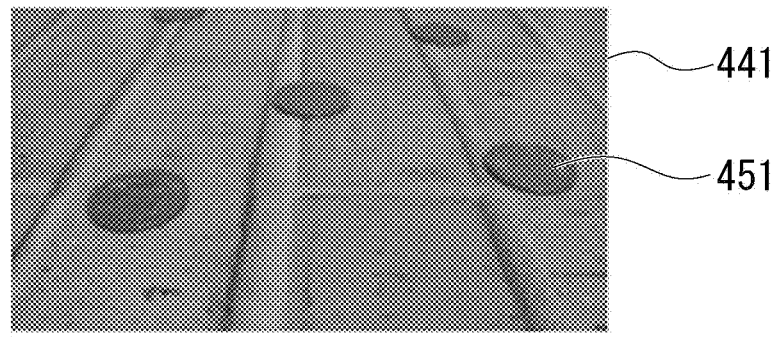
FIG. 4A is a diagram showing an example of a captured image according to the embodiment.

FIG. 4A is a diagram showing an example of a captured image 441 according to the embodiment.

Figure 4B:
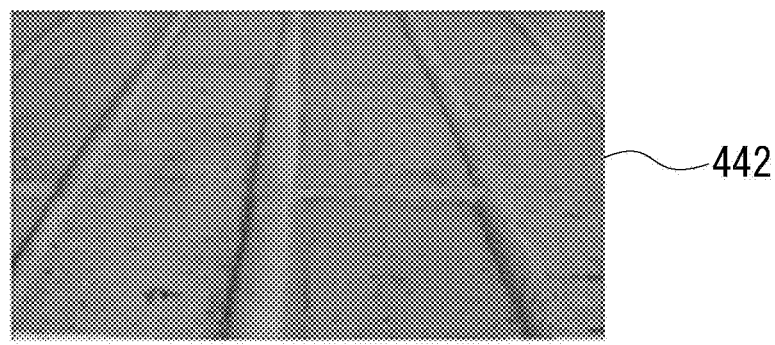
FIG. 4B is a diagram showing an example of a reference image according to the embodiment.

FIG. 4B is a diagram showing an example of a reference image 442 according to the embodiment.

Figure 4C:
FIG. 4C is a diagram showing an example of a difference image according to the embodiment.

FIG. 4C is a diagram showing an example of a difference image 113 according to the embodiment.

Here, the reference image 442 is the initial reference image 351 at the initial stage and is the updated reference image 352 after the reference image is updated one or more times.

The present example is an example in which the captured image 111 includes a foreign substance portion 451 which is an image portion of a foreign substance (an example of the foreign substance 41). Although a plurality of foreign substance portions are shown in the example of FIG. 4A, the illustration is simplified and only one foreign substance portion 451 is denoted by a reference numeral.

In the foreign substance detection device 13, the determination unit 331 compares the captured image 441 serving as a determination target with the reference image 442 stored in the storage unit 313 and calculates the difference image 443 representing the difference between these two images.

The determination unit 331 calculates the number (total number) of pixels having a difference in the difference image 443, determines that there is a foreign substance 41 when the number is greater than or equal to the prescribed first threshold value, and determines that there is no foreign substance 41 when the number is less than the first threshold value.

In the example of FIG. 4C, the difference image 443 shows a foreign substance portion 461 which is an image portion including pixels having a difference. Although a plurality of foreign substance, portions are shown in the example of FIG. 4C, the illustration is simplified and only one foreign substance portion 461 is denoted by a reference numeral.

Here, each foreign substance portion 451 shown in FIG. 4A and each foreign substance portion 461 shown in FIG. 4C are portions due to the same foreign substance 41.

In the example of FIG. 4C, it is assumed that the number of pixels having a difference is greater than or equal to the first threshold value and the determination unit 331 determines that there is a foreign substance 41.

An example of the determination of the necessity of maintenance will be described with reference to FIGS. 5A, 5B, and 5C.

Figure 5A:
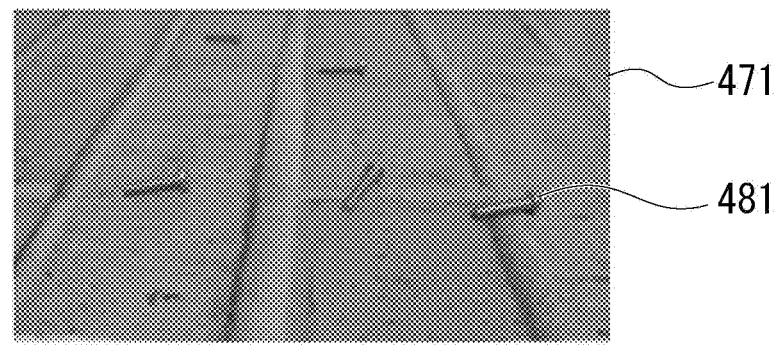
FIG. 5A is a diagram showing an example, of an updated reference image according to the embodiment.

FIG. 5A is a diagram showing an example of an updated reference image 471 according to the embodiment.

Figure 5B:
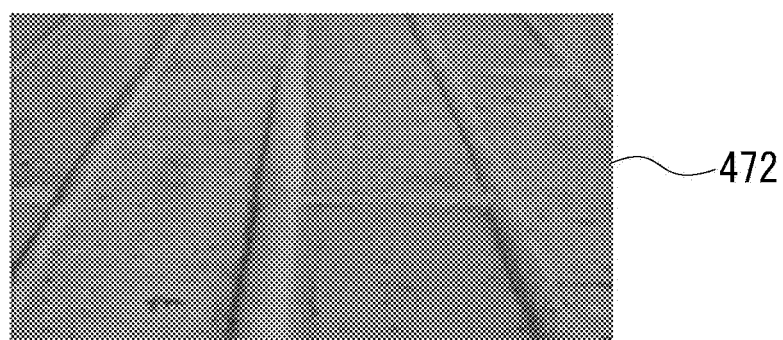
FIG. 5B is a diagram showing an example of an initial reference image according to the embodiment.

FIG. 5B is a diagram showing an example of an initial reference image 472 according to the embodiment.

Figure 5C:
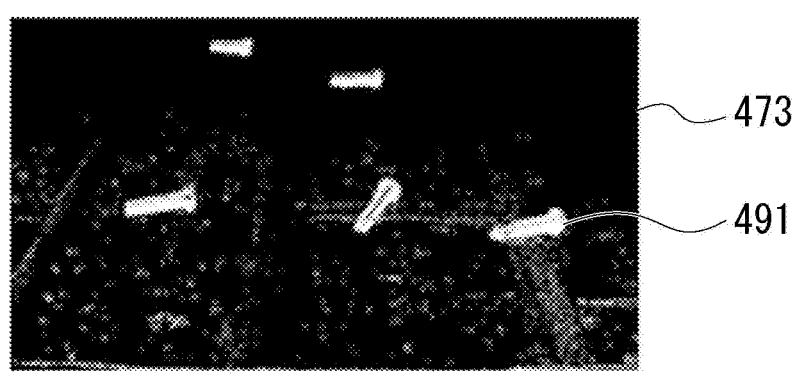
FIG. 5C is a diagram showing an example of a difference image according to the embodiment.

FIG. 5C is a diagram showing an example of a difference image 473 according to the embodiment.

Here, the updated reference image 471 corresponds to the updated reference image 352 in the example of FIG. 2 and the initial reference image 472 corresponds to the initial reference image 351 in the example of FIG. 2.

The present example is an example in which the updated reference image 471 includes a deterioration portion 481 which is an image portion of deterioration having a degree at which maintenance is determined to be necessary. Although a plurality of deterioration portions are shown in the example of FIG. 5A, the illustration is simplified and only one deterioration portion 481 is denoted by a reference numeral.

Also, the deterioration portion may be, for example, dirt of the power transmission coil cover 115 due to aged deterioration or a deterioration portion due to deterioration in the coating, and may include a foreign substance (for example, a small foreign substance or the like).

In the foreign substance detection device 13, the determination unit 131 compares the updated reference image 471 stored in the storage unit 313 with the initial reference image 472 stored in the storage unit 313 in the determination of the necessity of maintenance, and calculates the difference image 473 representing a difference between the two images.

The determination unit 331 calculates the number (total number) of pixels having a difference in the difference image 473, determines that maintenance is necessary when the number is greater than or equal to the prescribed second threshold value, and determines that maintenance is not necessary when the number is less than the second threshold value.

In the example of FIG. 5C, the difference image 473 shows a deterioration portion 491 which is an image portion including pixels having a difference. Although a plurality of deterioration portions are shown in the example of FIG. 5C, the illustration is simplified and only one deterioration portion 491 is denoted by a reference numeral.

Here, each deterioration portion 481 shown in FIG. 5A and each deterioration portion 491 shown in FIG. 5C are portions due to the same deterioration.

In the example of FIG. 5C, the number of pixels having a difference is greater than or equal to the second threshold value and the determination unit 331 determines that maintenance is necessary.

Also, instead of the determination of whether the number is greater than or equal to the second threshold value or less than the second threshold value, the determination of whether the number exceeds the second threshold value or is less than or equal to the second threshold value may be used.

Although the case where the updated reference image 471 and the initial reference image 472 are compared to determine the necessity of maintenance has been described in the present example, a configuration for determining the necessity of maintenance by comparing a captured image for which it is determined that there is no foreign substance with the initial reference image 472 may be used as another configuration example.

Here, in FIGS. 3A to 3C, 4A to 4C, and 5A to 5C, the difference images 413, 443, and 473 may be represented by values other than binary values.

<Process Performed by Foreign Substance Detection Device>

Figure 6:
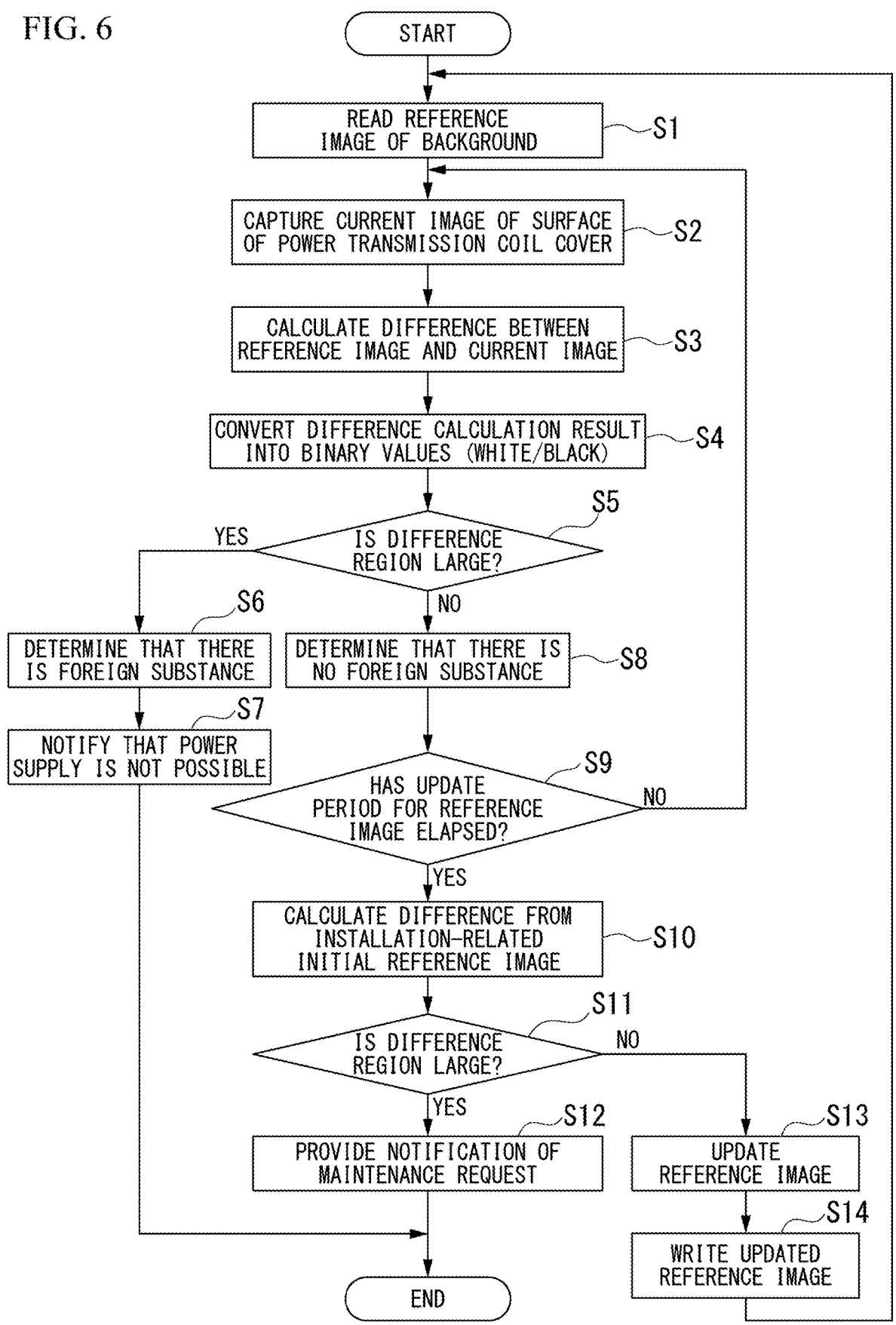
FIG. 6 is a diagram showing an example of a processing procedure performed in the foreign substance detection device according to the embodiment.

FIG. 6 is a diagram showing an example of a processing procedure performed by the foreign substance detection device 13 according to the embodiment.

(Step S1)
The determination unit 331 reads a background reference image from the storage unit 313. The process proceeds to step S2.

Here, the reference image is the initial reference image 351 at the initial stage, and is the updated reference image 352 after the reference image is updated one or more times.

(Step S2)
The determination unit 331 acquires a captured image serving as a determination target. The process proceeds to step S3.

Here, the captured image is a currently captured image captured by the imaging device 14 and is a captured image obtained by imaging a foreign substance detection region including the surface of the power transmission coil cover 115 (for example, the entire surface) in the present embodiment.

Although the case where the determination unit 331 sets the currently captured image as the determination target in real time is shown in the present example, the determination unit 331 may set a previously captured image as the determination target as another example.

(Step S3)
The determination unit 331 calculates a difference (a difference image) between the reference image and the currently captured image serving as the determination target. The process proceeds to step S4.

(Step S4)
The determination unit 331 converts the result of calculating the difference (the difference image) into binary values (for example, value 1 representing white and value 0 representing black). The process proceeds to step S5.

(Step S5)
The determination unit 331 determines whether or not a value representing a difference region is greater than or equal to the prescribed first threshold value. In the present embodiment, the total number of pixels having a difference is used as a value representing a difference region, which is proportional to a total area of the region of the pixels having the difference.

As a result of the above determination, when the determination unit 331 determines that the value representing the difference region is greater than or equal to the first threshold value (step S5: YES), the process proceeds to step S6.

On the other hand, as a result of the above determination, when the determination unit 331 determines that the value representing the difference region is less than the first threshold value (step S5: NO), the process proceeds to step S8.

(Step S6)
The determination unit 331 determines that there is a foreign substance 41. The process proceeds to step S7.

(Step S7)
The determination unit 331 notifies the communication unit 113 of the wireless power transmission device 11 that power supply (power transmission) is not possible through the communication unit 312. The process of the present flow is completed.

In this case, in the wireless power transmission device 11, the control unit 114 controls the power transmission unit 112 so that the power transmission unit 112 stops the power transmission in response to the notification from the foreign substance detection device 13. In this way, in the wireless power transmission device 11, when the foreign substance detection device 13 detects the foreign substance 41, the power transmission is stopped.

(Step S8)
The determination unit 331 determines that there is no foreign substance. The process proceeds to step S9.

(Step S9)
The determination unit 331 determines whether or not an update period for the reference image has elapsed. For example, the update period is preset.

Here, although the update period is a fixed period in the present embodiment, the update period may be a variable period due to some factor as another example.

As a result of the above determination, when the determination unit 331 determines that the update period for the reference image has elapsed (step S9: YES), the process proceeds to step S10.

On the other hand, as a result of the above determination, when the determination unit 331 determines that the update period for the reference image has not elapsed (step S9: NO), the process proceeds to step S2.

(Step S10)
The determination unit 331 compares the installation-related initial reference image (the initial reference image 351 in the present embodiment) with the updated reference image 352 and calculates a value representing a region of a difference between these two images. The process proceeds to step S11.

Here, in the present embodiment, the initial reference image 351 at the time of initial setting or at the time of setting after the end of the previous maintenance is used as the installation-related initial reference image.

In the present embodiment, when the initial reference image 351 has not been updated even once, the processing of step S10 and the processing of step S11 may be omitted and the process may proceed to step S13.

(Step S11)

The determination unit 331 determines whether or not the value representing the difference region is greater than or equal to the prescribed second threshold value. In the present embodiment, the total number of pixels having the difference is used as a value representing the difference region, which is proportional to a total area of the region of the pixels having the difference.

As a result of the above determination, when the determination unit 331 determines that the value representing the difference region is greater than or equal to the second threshold value (step S11: YES), the process proceeds to step S12.

On the other hand, as a result of the above determination, when the determination unit 331 determines that the value representing the difference region is less than the second threshold value (step S11: NO), the process proceeds to step S13.

(Step S12)

The determination unit 331 determines that maintenance is necessary and the notification unit 332 notifies that maintenance is necessary. The process of the present flow is completed.

As described above, in the present example, when the update period for the reference image (a fixed period in the present embodiment) has elapsed, the installation-related initial reference image (the initial reference image 351 in the present embodiment) is compared with the updated reference image 352. When a difference between the initial reference image 351 and the updated reference image 352 is large, it is determined that the power transmission coil cover 115 needs to be repaired due to deterioration in the power transmission coil cover 115 or the like and a notification, of a maintenance request is provided.

(Step S13)

The determination unit 331 determines that the reference image is to be updated and updates the reference image. The process proceeds to step S14.

As described above, when the update period for the reference image (a fixed period in the present embodiment) has elapsed continuously in a state in which it is determined that there is no foreign substance 41 in the present example, the reference image is automatically updated for each update period.

For example, when only the initial reference image is used as in the related art, if the background changes due to dirt due to aging of the power transmission coil cover, deterioration in the coating, or the like, there is a high possibility that such changes will also be regarded as foreign substances and erroneously determined. However, in the foreign substance detection device 13 according to the present embodiment, such an erroneous determination can be limited by updating the reference image.

(Step S14)

The determination unit 331 rites the updated reference image to the storage unit 313. Thereby, the reference image is stored as the updated reference image 352 (the latest reference image) in the storage unit 313. The process of the present flow is completed.

Here, the updated reference image may be, for example, a captured image that has been captured immediately before a point in time when it is determined that the reference image is to be updated or after a point in time when it is determined that the reference image is to be updated.

Also, the processing flow shown in FIG. 6 is an example, the processing flow is not limited thereto, and any other processing flow may be used.

<Specific Example of Arrangement of Imaging Device>

FIG. 7 is a diagram showing, an example of an arrangement of the imaging device 14 according to the embodiment.

In FIG. 7, XYZ coordinate axes similar to those shown in FIG. 1 are shown.

FIG. 7 shows a state of viewing with a line of sight parallel to a floor 611. For example, the floor 611 is a plane perpendicular to the direction of gravity. The floor 611 may have any angle with respect to the direction of gravity. In the present embodiment, the floor 611 may be the ground surface (the ground).

FIG. 7 shows an outline of the wireless power transmission device 11.

The power transmission coil cover 115 is arranged on the floor 611 and the power transmission coil 111 including a power transmission coil unit 511a and a power transmission coil unit 511b is arranged under the floor 611.

Here, each of the power transmission coil unit 511a and the power transmission coil unit 511b represents a part of the integrated power transmission coil 111 and a cross-section of the power transmission coil 111 configured in a state in which a conductor wire has been wound a plurality of times on a surface parallel to the floor 611 is shown in FIG. 7.

Also, in FIG. 7, the power transmission unit 112, the communication unit 113, and the control unit 114 are shown.

Also, in FIG. 7, the foreign substance 41 is shown.

In FIG. 7, a vertical width H1 of the AGV 21 when the AGV 21 is located above the power transmission coil 111 is shown.

Here, the vertical width H1 is a width between a location on the AGV 21 closest to the floor 611 (normally, the location of the wheel 22 or 23 in contact with the floor 611) and a location farthest from the floor 611. In the example of FIG. 1, the vertical width H1 is a width between a lower surface of the wheels 22 and 23, which is the lowest position on the AGV 21, and an upper surface of a housing, which is the highest position on the AGV 21.

FIG. 7 shows four examples as an example of an arrangement of the imaging device 14.

Hereinafter, Arrangement Example 1 in which an imaging device 14a establishes a communication connection with the communication unit 113 via a foreign substance detection device 13a, Arrangement Example 2 in which an imaging device 14b establishes a communication connection with the communication unit 113 via a foreign substance detection device 13b. Arrangement Example 3 in which an imaging device 14c establishes a communication connection with the communication unit 113 via a foreign substance detection device 13c, and Arrangement Example 4 in which two imaging devices 14d and 14e establish communication connections with the communication unit 113 via a foreign substance detection device 13d will be described.

Here, the imaging devices 14a to 14e are examples of the imaging device 14, the foreign substance detection devices 13a to 13d are examples of the foreign substance detection device 13, and it is only necessary to provide the imaging devices and the foreign substance detection devices related to the examples in Arrangement Examples 1 to 4. That is, although four Arrangement Examples 1 to 4 are shown together in FIG. 7, Arrangement Examples 1 to 4 may be carried out, independently. However, two or more different configurations of Arrangement Examples 1 to 4 may be provided and these arrangement examples may be configured to be switchable or shareable.

(Arrangement Example 1 of Imaging Device)

The imaging device 14a will be described.

The imaging device 14a is attached to a support member 631 and is arranged at a position higher than the highest position on the AGV 21.

Also, a detailed description of the support member 631 will be omitted. Also, the imaging device 14a may be arranged using a structure other khan the support member 631.

The imaging device 14a is arranged above the surface of the power transmission coil 111, for example, above the center position of the surface.

In FIG. 7, an angle of view 1011 of the imaging device 14a is shown. The angle of view 1011 is an example and is not limited to the example of FIG. 7.

(Arrangement Example 2 of Imaging Device)

The imaging device 14b will be described.

The imaging device 14b is attached to a support member 651 and is arranged at a position higher than the highest position on the AGV 21.

Also, a detailed description of the support member 651 will be omitted. Also, the imaging device 14b may be arranged using a structure other than the support member 651.

The imaging device 14b is arranged above the outside of the surface of the power transmission coil 111 (the outside of the XY plane in the example of FIG. 7), In FIG. 7, an angle of view 1012 of the imaging device 14b is shown. The angle of view 1012 is an example and, is not limited to the example of FIG. 7.

As described above, the imaging device 14b is installed outside a region where the power transmission coil 111 and the power reception coil 211 face each other during wireless power transmission.

Also, the imaging device 14b is installed at a position higher than a height position of a device (the AGV 21 in the present embodiment) equipped with the wireless power reception device 12.

(Arrangement Example 3 of Imaging Device)

The imaging device 14c will be described,

The imaging device 14e is attached to the support member 651 and is arranged at a height position within the vertical width H1 of the AGV 21.

Also, a detailed description of the support member 651 will be omitted. Also, the imaging device 14c may be arranged using a structure other than the support member 651.

The imaging device 14c is arranged above the outside of the surface of the power transmission coil 111 (the outside of the XY plane in the example of FIG. 7), In FIG. 7, an angle of view 1013 of the imaging device 14c is shown. The angle of view 1013 is an example and, is not limited to the example of FIG. 7.

As described above, the imaging device 14c is installed outside the region where the power transmission coil 111 and the power reception coil 211 face each other during wireless power transmission. Also, the imaging device 14c is installed at a position higher than the height position of the power transmission coil 111 and lower than the height position of the device (the AGV 21 in the present embodiment) equipped with the wireless power reception device 12.

(Arrangement Example 4 of Imaging Device)

The imaging device 14d and the imaging device 14e will be described.

The imaging device 14d and the imaging device 14e are arranged above the surface of the power transmission coil 111 and at height positions within the vertical width H1 of the AGV 21. For example, a portion near the center of the power transmission coil 111 is hollowed out in the power transmission coil cover 115 and the imaging device 14d and the imaging device 14e are arranged above the portion.

Also, the wireless power transmission device 11 includes a cover 531 with which upper portions of the imaging device 14d and the imaging device 14e are covered. It is assumed that the cover 531 has, for example, a transparent material and does not affect the foreign substance 41 or the deterioration state in images captured by the imaging device 14d and the imaging device 14e.

The cover 531 is arranged so that the cover 531 does not come into contact with the AGV 21 even if the AGV 21 is located above the cover 531. In the present embodiment, the cover 531 is arranged to fit below the lower surface of the housing from which the wheels 22 and 23 of the AGV 21 are excluded even if the AGV 21 is located above the cover 531.

In FIG. 7, an angle of view 1014 of the imaging device 14d and an angle of view 1015 of the imaging device 14e are shown. These angles of view 1014 and 1015 are examples and are not limited to the example of FIG. 7.

Here, the plurality of imaging devices 14d and 14e provided in the wireless power transmission device 11 have different imaging ranges. Also, some of these imaging ranges may overlap.

As an example, the imaging devices 14d and 14e are attached to a cover (the power transmission coil cover 115) with which the power transmission coil 111 is covered and may be installed at a position facing the opening of the power transmission coil 111.

As another example, the imaging devices 14d and 14c may be housed in a housing configured to house the power transmission coil 111 and may be installed at a position facing the opening of the power transmission coil 111. For example, the imaging devices 14d and 14e may be attached to and built into a main body (the power transmission coil unit) of the power transmission coil 111.

<Regarding Above Embodiment>

As described above, in the wireless power transmission system 1 according to the present embodiment, because the foreign substance detection device 13 performs a foreign substance detection operation in consideration of a change over time in a foreign substance detection region, it is possible to limit deterioration in the accuracy of foreign substance detection, for example, even if the state of the foreign substance detection region can change.

For example, in the foreign substance detection device 13, it is possible to reduce the erroneous determination in which it is determined that the deterioration is a foreign substance by updating the reference image with respect to deterioration which progresses gradually such as dust, scratches, and peeling of a coating on the surface of the wireless power transmission device 11 as compared with the case where only the reference image at the time of installation (the initial reference image 351 in the present embodiment) is used as a reference image to be compared with the captured image.

Because it is assumed that the wireless power reception device 12 (the SGV 21 equipped with the wireless power reception device 12 in the present embodiment) frequently passes through the wireless power transmission device 11, it is considered that contamination and deterioration of the device surface shown in the reference image will progress with the elapse of time in the wireless power transmission device 11. Therefore, the foreign substance detection device 13 determines a period when such a change over time can occur and the like and performs a process of updating the reference image at an appropriate timing.

As described above, the foreign substance detection device 13 according to the present embodiment can determine, for example, the presence or absence of foreign substance intrusion before the next wireless power transmission is started. Thereby, the wireless power transmission device 11 can safely start power transmission. Also, the foreign substance detection device 13 can detect a foreign substance with a small number of images (for example, a minimum number of still images) and requires minimum operations in the imaging device 14, the calculation unit (the control unit 314 in the present embodiment), the storage unit 313 for the reference image, and the communication unit 312, so that power saving, low cost, and miniaturization of the device are possible.

Also, the foreign substance, detection device 13 can simplify a maintenance operation using a function of determining the necessity of maintenance on the exterior of the device.

For example, the foreign substance detection device 13 can detect deterioration in a member in the background of a reference image and provide a notification of a maintenance request, whereby maintenance can be executed.

Also, the foreign substance detection device 13 can detect a failure of the imaging device 14 itself.

Also, the foreign substance detection device 13 can provide a reference image for flexibly coping with various installation conditions, the brightness of an installation location, a background, an influence of shadows, and the like by acquiring the reference image at the time of installation of the wireless power transmission device 11.

Also, because it is only necessary to perform a determination operation only for a short time period (for example, about 1 minute) in which a foreign substance is determined in advance of the start of power transmission by acquiring the captured image in advance of the start of power transmission or by acquiring the captured image before the wireless power reception device 12 arrives above the power transmission coil 111, the foreign substance detection device 13 can shorten an operation time period and can reduce power consumption for, detecting the foreign substance.

For example, the foreign substance detection device 13 can perform foreign substance detection for a short time period up to a few seconds before the wireless power reception device 12 approaches the wireless, power transmission device 11 in advance of the start of power reception and reaches a position where electric power can be transmitted for power reception, determine deterioration for maintenance, and determine whether or not power transmission can be started safely.

Here, although a device serving as a charging target must be moved so that a foreign substance is removed in, a method of detecting the foreign substance after the start of power transmission, the foreign substance detection device 13 according to the present embodiment enables a foreign substance detection process and a charging process to be performed smoothly, for example, by acquiring a captured image of a determination target and completing the determination of the presence or absence of a foreign substance before the start of power transmission.

In the foreign substance detection device 13, for example, when a device (the AGV 21 in the present embodiment) equipped with the wireless power reception device 12 carries an article at a lower height, the imaging device 14 (for example, the imaging, device 14a shown in FIG. 7) is installed at a position higher than that of the device, so that the state of the wireless power transmission device 11 can be easily monitored before the start of power transmission and a monitoring process can be, performed without interfering with an operation of the device.

In the foreign substance detection device 13, for example, when the device (the AGV 21 in the present embodiment) equipped with the wireless power reception device 12 is a tall and large device, a distance to the wireless power transmission device 11 is long in a monitoring process from above, but a foreign substance can be reliably detected in a monitoring process using the imaging device 14 (for example, the imaging device 14b shown in FIG. 7) from outside of the region where the power transmission coil 111 and the power reception coil 211 face each other.

In the foreign substance detection device 13, for example, in the case where the device (the AGV 21 in the present embodiment) equipped with the wireless power reception device 12 is a tall and large device, it is possible to detect a foreign substance without hindering the movement of the device by performing a monitoring process using the imaging device 14 (for example, the imaging device 14c shown in FIG. 7) located at a height position within the vertical width H1 of the device from outside of the region where the power transmission coil 111 and the power reception coil 211 face each other when a space between the power transmission coil 111 and the power reception coil 211 is wide.

In the foreign substance detection device 13, for example, when a space where the imaging device 14 is installed cannot be secured outside the region of the wireless power transmission device 11, the imaging device 14 (for example, the imaging devices 14d and 14e shown in FIG. 7) is installed near the center of the power transmission coil cover 115, so that it is possible to detect a foreign substance by operating the imaging devices 14d and 14e before power transmission at a position where the central part of the power transmission coil 111 is hollowed out and an influence of a magnetic force is small in a space-saving manner.

In the foreign substance detection device 13, for example, when a space where the imaging device 14 is installed cannot be secured outside the region of the wireless power transmission device 11, the imaging device 14 (for example, the imaging devices 14d and 14e shown in FIG. 7) is installed near the center of the housing of the power transmission coil 111, so that it is possible to detect a foreign substance by operating the imaging devices 14d and 14e before power transmission at a position where the central part of the power transmission coil 111 is hollowed out and an influence of a magnetic force is small in a space-saving manner.

Also, in the foreign substance detection device 13, even in a large wireless power transmission device 11, for example, a small foreign substance can be detected without being overlooked when a plurality of imaging devices (for example, the imaging devices 14d and 14e shown in FIG. 7) are used.

Although the case where the foreign substance detection device 13 is applied to the wireless power transmission device 11 of the wireless power transmission system 1 has been described above, a foreign substance detection device having functions similar to some or all of the functions of the foreign substance detection device 13 according to the present embodiment may be applied to various, other fields.

<Configuration Example>

As a configuration example, a foreign substance detection device (a foreign substance detection device 13 in the present embodiment) includes an imaging device (the imaging device 14 in the example of FIG. 1) configured to keep a region for detecting a foreign substance in an imaging range of the imaging device; and a determination unit (the determination unit 331 in the example of FIG. 2) configured to determine a presence or absence of the foreign substance on the basis of a result of comparing a captured image captured by the imaging device with a reference image (the initial reference image 351 or the updated reference image 352 in the example of FIG. 2) free of the foreign substance in the imaging range, wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image.

As a configuration example, the foreign substance detection device further includes a notification unit (the notification unit 332 in the example of FIG. 2) configured to be able to externally transmit a maintenance request signal, wherein the determination unit compares an initial reference image among reference images with the updated reference image in accordance with a prescribed second condition that is satisfied, and wherein the notification unit externally transmits the maintenance request signal when a result of comparing the initial reference image with the updated reference image indicates that a prescribed third condition is satisfied.

As a configuration example, in the foreign substance detection device, the determination unit determines the presence or absence of an abnormality of the captured image and externally transmits a signal indicating that there is an abnormality in the imaging device when it is determined that the captured image is abnormal.

As a configuration example, in the foreign substance detection device, the first condition is that the foreign substance detection device is activated.

As a configuration example, in the foreign substance detection device, the first condition is that the number of consecutive times it is determined that there is no foreign substance on the basis of the comparison result exceeds the prescribed, number of times.

As a configuration example, in the foreign substance detection device, the first condition is that it is determined that there is no foreign substance on the basis of the comparison result continuously for a prescribed period.

As a configuration example, in the foreign substance detection device, the first condition is that a consecutive operation time period has elapsed for a prescribed time period.

As a configuration example, in the foreign substance detection device, the first condition is that a prescribed time period corresponding to a determined date and time has elapsed.

As a configuration example, a wireless power transmission device (the wireless power transmission device 11 in the present, embodiment) includes a power transmission coil (the power transmission coil 111 in the example of FIG. 1); a power transmission unit (the power transmission unit 112 in the example of FIG. 1) configured to supply AC power to the power transmission coil; and the foreign substance detection device.

As a configuration example, a wireless power transmission device (the wireless power transmission device 11 in the present embodiment) includes a power transmission coil (the power transmission coil 111 in the example of FIG. 1); a power transmission unit (the power transmission unit 112 in the example of FIG. 1) configured to supply AC power to the power transmission coil; and the foreign substance detection device, wherein the prescribed time period is longer than a time period of one power transmission cycle in which power transmission starts and ends.

As a configuration example, in the wireless power transmission device, the foreign substance detection device acquires the reference, image captured by the imaging device when the wireless power transmission device is installed and stores the acquired reference image in a storage unit.

As a configuration example, in the wireless power transmission device, the foreign substance detection device executes an operation of determining the presence or absence of the foreign substance before the power transmission of the wireless power transmission device starts.

As a configuration example, in the wireless power transmission device, the imaging device is attached to a cover (the power transmission coil cover 115 in the example of FIG. 1) with which the power transmission coil is covered and installed at a position facing an opening of the power transmission coil.

As a configuration example, in the wireless power transmission device, the imaging device is housed in a housing configured to house a power transmission coil and installed at a position facing an opening of the power transmission coil.

As a configuration example, the wireless power transmission device includes a plurality of imaging devices, wherein the plurality of imaging devices have different imaging ranges.

As a configuration example, in the wireless power transmission device, the imaging device is installed outside a region where the power transmission coil faces a power reception coil (the power reception coil 211 in the example in FIG. 1) of a wireless power reception device (the wireless power reception device 12 in the present embodiment) having the power reception coil to which the wireless power transmission device transmits electric power.

As, a configuration example, in the wireless power transmission device, the imaging device is installed at a position higher than a height position of the power transmission coil and lower than a height position of a device equipped with the wireless power reception device.

As a configuration example, in the wireless power transmission device, the imaging device is installed at a position higher than a height position of a device equipped with a wireless power reception device having a power reception coil to which the wireless power transmission device transmits electric power. Furthermore, as a configuration example, in the wireless power transmission device, the imaging device is installed outside a region where the power transmission coil faces the power reception coil.

As a configuration example, in a wireless power transmission device, the foreign substance detection device acquires the captured image for determining the presence or absence of the foreign substance captured by the imaging device before a device equipped with a wireless power reception device having a power reception coil to which the wireless power transmission device transmits electric power is arranged above the power transmission coil.

As a configuration example, a wireless power transmission system (the wireless power transmission system 1 in the present embodiment) includes a wireless power transmission device and a wireless power reception device.

Also, a program for implementing the function of any component of any device described above may be recorded on a computer-readable recording medium and the program may be read and executed by a computer system. Also, the "computer system" used here may include an operating system (OS) or hardware such as peripheral devices. Also, the "computer-readable recording medium" refers to a storage device such as a flexible disc, a magneto-optical disc, a read-only memory (ROM), a portable medium such as a compact disc-ROM (CD-ROM), and a hard disk embedded in the computer system. Furthermore, the "computer-readable recording medium" is assumed to include a medium that holds a program for a constant period of time, such as a volatile memory inside a computer system serving as a server, or a client when the program is transmitted via a network such as the Internet or a communication circuit such as a telephone circuit. For example, the volatile memory may be a random-access memory (RAM). For example, the recording medium may be a non-transitory recording medium.

Also, the above-described program may be transmitted from a computer system storing the program in a storage device or the like to another computer system via a transmission medium or by transmission waves in a transmission medium. Here, the "transmission medium" for transmitting the program refers to a medium having a function of transmitting information, as in a network such as the Internet or a communication circuit such as a telephone circuit.

Also, the above-described program may be a program for implementing some of the above-described functions. Further, the above-described program may be a so-called differential file capable of implementing the above-described function in combination with a program already recorded on the computer system. The differential file may be referred to as a differential program.

Also, the function of any component of any device described above may be implemented by a processor. For example, each process in the embodiment may be implemented by a processor that operates on the basis of information of a program or the like and a computer-readable recording medium that stores information of a program or the like. Here, in the processor, for example, the function of each part may be implemented by individual hardware or the function of each part may be implemented by integrated hardware. For example, the processor may include hardware and the hardware may include at least one of a circuit that processes a digital signal and a circuit that processes an, analog signal. For example, the processor may be configured using one or more circuit devices or/and one or more circuit elements mounted on a circuit board. An integrated circuit (IC) or the like may be used as the circuit device and a resistor, a capacitor, or the like may be used as the circuit element.

Here, the processor may be, for example, a CPU. However, the processor is not limited to the CPU and, for example, various types of processors such as a graphics processing unit (GPU) or a digital signal processor (DSP) may be used. Also, for example, the processor may be a hardware circuit based on an application specific integrated circuit (ASIC). Also, the processor may include, for example, a plurality of CPUs, or may include a hardware circuit of a plurality of ASICs. Also, the processor may include, for example, a combination of a plurality of CPUs and a hardware circuit including a plurality of ASICs. Also, the processor may include, for example, one or more of an amplifier circuit and a filter circuit for processing an analog signal and the like.

Although embodiments of the present disclosure have been described above with reference to the drawings, specific configurations are not limited to the embodiments and other designs and the like may also be included without departing from the scope of the present disclosure.

Aspects of the present disclosure are shown below (1) to (24).

(1) A foreign substance detection device comprising: an imaging device configured to keep a region for detecting a foreign substance in an imaging range of the imaging device; and a determination unit configured to determine a presence or absence of the foreign substance on the basis of a result of comparing a captured image captured by the imaging device with a reference image free of the foreign substance in the imaging range, wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image.

(2) The foreign substance detection device according to (1), further comprising a notification unit configured to be able to externally transmit a maintenance request signal, wherein the determination unit compares an initial reference image among reference images with the updated reference image in accordance with a prescribed second condition that is satisfied, and wherein the notification unit externally transmits the maintenance request signal when a result of comparing the initial reference image with the updated reference image indicates that a prescribed third condition is satisfied.

(3) The foreign substance detection, device according to (1) or (2) wherein the determination unit determines the presence or absence of an abnormality of the captured image and externally transmits a signal indicating that there is an abnormality in the imaging device when it is determined that the captured image is abnormal.

(4) The foreign substance detection device according to any one of (1) to (3), wherein the first condition is that the foreign substance detection device is activated.

(5) The foreign substance detection device according to any one of (1) to (3), wherein the first condition is that the number of consecutive times it is determined that there is no foreign substance on the basis of the comparison result exceeds the prescribed number of times.

(6) The foreign substance detection device according to any one of (1) to (3), wherein the first condition is that it is determined that there is no foreign substance on the basis of the comparison result continuously for a prescribed period.

(7) The foreign substance detection device according to any one of (1) to (3), wherein the first condition is that a consecutive operation time period has elapsed for a prescribed time period.

(8) The foreign substance detection device according to any one of (1) to (3), wherein the first condition is that a prescribed time period corresponding to a determined date and time has elapsed.

(9) A wireless power transmission device comprising: a power transmission coil; a power transmission unit, configured to supply alternating current (AC) power to the power transmission coil; and the foreign substance detection device according to any one of (1) to (8).

(10) A wireless power transmission device comprising: a power transmission coil; a power transmission unit configured to supply AC power to the power transmission coil; and the foreign substance detection device according to (7) or (8), wherein the prescribed time period is longer than a time period of one power transmission cycle in which, power transmission starts and ends.

(11) The wireless power transmission device according to (9) or (10), wherein the foreign substance detection device acquires the reference image captured by the imaging device when the wireless power transmission device is installed and stores the acquired reference image, in a storage unit.

(12) The wireless power transmission device according to any one of (9) to (11), wherein the foreign substance detection device executes an operation of determining the presence or absence of the foreign substance before the power transmission of the wireless power transmission device starts.

(13) The wireless power transmission device according to any one of (9) to (12), wherein the imaging device is attached to a cover with which the power transmission coil is covered and installed at a position facing an opening of the power transmission coil.

(14) The wireless power transmission device according to any one of (9) to (12), wherein the imaging device is housed in a housing configured to house the power transmission coil and installed at a position facing an opening of the power transmission coil.

(15) The wireless power transmission device according to (13) or (14), comprising a plurality of imaging devices, wherein the plurality of imaging devices have different imaging ranges.

(16) The wireless power transmission device according to any one of (9) to (12), wherein the imaging device is installed outside a region where the power transmission coil faces a power reception coil of a wireless power reception device having the power reception coil to which the wireless power transmission device transmits electric power.

(17) The wireless power transmission device according to (16), wherein the imaging device is installed at a position higher than a height position of the power transmission coil and lower than a height position of a device equipped with the wireless power reception device.

(18) The wireless power transmission device according to any one of (9) to (12), wherein the imaging device is installed at a position higher than a height position of a device equipped with a wireless power reception device having a power reception coil to which the wireless power transmission device transmits electric power.

(19) The wireless power transmission device according to (18), wherein the imaging device is installed outside a region where the power transmission coil faces the power reception coil.

(20) The wireless power transmission device according to any one of (9) to (15), wherein the foreign substance detection device acquires the captured image for determining the presence or absence of the foreign substance captured by the imaging device before a device equipped with a wireless power reception device having a power reception coil to which the wireless power transmission device transmits electric power is arranged above the power transmission coil.

(21) The wireless power transmission device according to (16), wherein the foreign substance detection device acquires the captured image for determining the presence or absence of the foreign substance captured by the imaging device before the device equipped with the wireless power reception device is arranged above the power transmission coil.

(22) The wireless power transmission device according to any one of (17) to (19), wherein the foreign substance detection device acquires the captured image for determining the presence or absence of the foreign substance captured by the imaging device before the device equipped with the wireless power reception device is arranged above the power transmission coil.

(23) A wireless power transmission system comprising: the wireless power transmission device according to any one of (9) to (15); and a wireless power reception device having a power reception coil to which the wireless power transmission device transmits electric power.

(24) A wireless power transmission system comprising: the wireless power transmission device according to any one of (16) to (22); and the wireless power reception device.

EXPLANATION OF REFERENCES

1 Wireless power transmission system
11 Wireless power transmission device
12 Wireless power reception device
13, 13a to 13d Foreign substance detection device
14, 14a to 14e Imaging device
21 AGV
22 to 23 Wheel
31 AC power source
41 Foreign substance
61 Light-emitting unit
111 Power transmission coil
112 Power transmission unit
113, 312 Communication unit
114, 314 Control unit
115 Power transmission coil cover
211 Power reception coil
212 Smoothing circuit
213 Battery
214 Controller
215 Motor
311 Captured image acquisition unit
313 Storage unit
331 Foreign substance presence or absence determination unit (Determination unit)
332 Notification unit
351, 472 Initial reference image
352, 471 Updated reference image
411, 441 Captured image
412, 442 Reference image
413, 443, 473 Difference image
451, 461 Foreign substance portion
481, 491 Deterioration portion
511a, 511b Power transmission coil unit
512 Electromagnetic shield plate
512a, 512b Electromagnetic shield plate unit
513 Cover
611 Floor
631, 651 Support member
1011 to 1015 Angle of view
H1 Vertical width
Q1 Power transmission

What is claimed is:

1. A foreign substance detection device comprising:
an imaging device configured to keep a region for detecting a foreign substance in an imaging range of the imaging device;
a determination unit configured to determine a presence or absence of the foreign substance on the basis of a result of comparing a captured image captured by the imaging device with a reference image free of the foreign substance in the imaging range; and
a notification unit configured to be able to externally transmit a maintenance request signal,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image,
wherein the determination unit compares an initial reference image among reference images with the updated reference image in accordance with a prescribed second condition that is satisfied, and
wherein the notification unit externally transmits the maintenance request signal when a result of comparing the initial reference image with the updated reference image indicates that a prescribed third condition is satisfied.

2. The foreign substance detection device according to claim 1, wherein the determination unit determines the presence or absence of an abnormality of the captured image and externally transmits a signal indicating that there is an abnormality in the imaging device when it is determined that the captured image is abnormal.

3. The foreign substance detection device according to claim 1, wherein the first condition is that the foreign substance detection device is activated.

4. A foreign substance detection device comprising:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image, and
wherein the first condition is that the number of consecutive times it is determined that there is no foreign substance on the basis of the comparison result exceeds the prescribed number of times.

5. A foreign substance detection device comprising:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image, and
wherein the first condition is that it is determined that there is no foreign substance on the basis of the comparison result continuously for a prescribed period.

6. A foreign substance detection device comprising:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image, and
wherein the first condition is that a consecutive operation time period has elapsed for a prescribed time period.

7. A foreign substance detection device comprising:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image, and
wherein the first condition is that a prescribed time period corresponding to a determined date and time has elapsed.

8. A wireless power transmission device comprising:
a power transmission coil;
a power transmission unit configured to supply alternating current (AC) power to the power transmission coil; and
the foreign substance detection device according to claim 1.

9. A wireless power transmission device comprising:
a power transmission coil;
a power transmission unit configured to supply alternating current (AC) power to the power transmission coil; and
the foreign substance detection device according to claim 4.

10. A wireless power transmission device comprising:
a power transmission coil;
a power transmission unit configured to supply alternating current (AC) power to the power transmission coil; and
the foreign substance detection device according to claim 5.

11. A wireless power transmission device comprising:
a power transmission coil;
a power transmission unit configured to supply alternating current (AC) power to the power transmission coil; and
the foreign substance detection device according to claim 6.

12. A wireless power transmission device comprising:
a power transmission coil;
a power transmission unit configured to supply alternating current (AC) power to the power transmission coil; and
the foreign substance detection device according to claim 7.

13. A wireless power transmission device comprising:
a power transmission coil;
a power transmission unit configured to supply AC power to the power transmission coil; and
the foreign substance detection device according to claim 6,
wherein the prescribed time period is longer than a time period of one power transmission cycle in which power transmission starts and ends.

14. A wireless power transmission device comprising:
a power transmission coil;
a power transmission unit configured to supply AC power to the power transmission coil; and
the foreign substance detection device according to claim 7,
wherein the prescribed time period is longer than a time period of one power transmission cycle in which power transmission starts and ends.

15. The wireless power transmission device according to claim 8, wherein the foreign substance detection device acquires the reference image captured by the imaging device when the wireless power transmission device is installed and stores the acquired reference image in a storage unit.

16. A wireless power transmission device comprising:
a power transmission coil;
a power transmission unit configured to supply alternating current (AC) power to the power transmission coil; and
a foreign substance detection device,
wherein the foreign substance detection device comprises:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image, and
wherein the foreign substance detection device executes an operation of determining the presence or absence of the foreign substance before the power transmission of the wireless power transmission device starts.

17. A wireless power transmission device comprising:
a power transmission coil;
a power transmission unit configured to supply alternating current (AC) power to the power transmission coil; and
a foreign substance detection device,
wherein the foreign substance detection device comprises:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image, and
wherein the imaging device is attached to a cover with which the power transmission coil is covered and installed at a position facing an opening of the power transmission coil.

18. A wireless power transmission device comprising:
a power transmission coil;
a power transmission unit configured to supply alternating current (AC) power to the power transmission coil; and
a foreign substance detection device,
wherein the foreign substance detection device comprises:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image, and
wherein the imaging device is housed in a housing configured to house the power transmission coil and installed at a position facing an opening of the power transmission coil.

19. The wireless power transmission device according to claim 17, comprising a plurality of imaging devices,
wherein the plurality of imaging devices have different imaging ranges.

20. The wireless power transmission device according to claim 18, comprising a plurality of imaging devices,
wherein the plurality of imaging devices have different imaging ranges.

21. The wireless power transmission device according to claim 8, wherein the imaging device is installed outside a region where the power transmission coil faces a power reception coil of a wireless power reception device having the power reception coil to which the wireless power transmission device transmits electric power.

22. A wireless power transmission device comprising:
a power transmission coil;
a power transmission unit configured to supply alternating current (AC) power to the power transmission coil; and
a foreign substance detection device,
wherein the foreign substance detection device comprises:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image,
wherein the imaging device is installed outside a region where the power transmission coil faces a power reception coil of a wireless power reception device having the power reception coil to which the wireless power transmission device transmits electric power, and
wherein the imaging device is installed at a position higher than a height position of the power transmission coil and lower than a height position of a device equipped with the wireless power reception device.

23. A wireless power transmission device comprising:
a power transmission coil;
a power transmission unit configured to supply alternating current (AC) power to the power transmission coil; and
a foreign substance detection device,
wherein the foreign substance detection device comprises:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image, and
wherein the imaging device is installed at a position higher than a height position of a device equipped with a wireless power reception device having a power reception coil to which the wireless power transmission device transmits electric power.

24. The wireless power transmission device according to claim 23, wherein the imaging device is installed outside a region where the power transmission coil faces the power reception coil.

25. A wireless power transmission device comprising:
a power transmission coil;
a power transmission unit configured to supply alternating current (AC) power to the power transmission coil; and
a foreign substance detection device,
wherein the foreign substance detection device comprises:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image, and
wherein the foreign substance detection device acquires the captured image for determining the presence or absence of the foreign substance captured by the imaging device before a device equipped with a wireless power reception device having a power reception coil to which the wireless power transmission device transmits electric power is arranged above the power transmission coil.

26. A wireless power transmission device comprising:
a power transmission coil;
a power transmission unit configured to supply alternating current (AC) power to the power transmission coil; and
a foreign substance detection device,
wherein the foreign substance detection device comprises:
an imaging device configured to keep a region for detecting a foreign substance in an imaging range of the imaging device; and
a determination unit configured to determine a presence or absence of the foreign substance on the basis of a result of comparing a captured image captured by the imaging device with a reference image free of the foreign substance in the imaging range,
wherein, when the determination unit determines that the captured image is free of a foreign substance on the basis of the result of comparing and a prescribed first condition is satisfied, the determination unit executes an update process of replacing the reference image with the captured image for which the determination unit determines to be free of a foreign substance as an updated reference image,
wherein the imaging device is installed outside a region where the power transmission coil faces a power reception coil of a wireless power reception device having the power reception coil to which the wireless power transmission device transmits electric power, and
wherein the foreign substance detection device acquires the captured image for determining the presence or absence of the foreign substance captured by the imaging device before the device equipped with the wireless power reception device is arranged above the power transmission coil.

27. The wireless power transmission device according to claim 22, wherein the foreign substance detection device acquires the captured image for determining the presence or absence of the foreign substance captured by the imaging device before the device equipped with the wireless power reception device is arranged above the power transmission coil.

28. A wireless power transmission system comprising:
the wireless power transmission device according to claim 8; and
a wireless power reception device having a power reception coil to which the wireless power transmission device transmits electric power.

29. A wireless power transmission system comprising:
the wireless power transmission device according to claim 21; and
the wireless power reception device.

* * * * *